(12) United States Patent
Catovic et al.

(10) Patent No.: US 8,538,425 B2
(45) Date of Patent: Sep. 17, 2013

(54) APPARATUS AND METHOD FOR IMPROVING MOBILE TERMINATED CELL SETUP PERFORMANCE DURING INTER-FREQUENCY CELL RESELECTION

(75) Inventors: Amer Catovic, San Diego, CA (US); Francesco Pica, San Diego, CA (US); Mukesh K. Mittal, San Diego, CA (US); Mustafa Saglam, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 706 days.

(21) Appl. No.: 12/491,856

(22) Filed: Jun. 25, 2009

(65) Prior Publication Data
US 2010/0003978 A1 Jan. 7, 2010

Related U.S. Application Data

(60) Provisional application No. 61/077,258, filed on Jul. 1, 2008.

(51) Int. Cl.
*H04W 4/00* (2009.01)
*H04W 68/00* (2009.01)
*H04W 36/00* (2009.01)
*H04W 72/00* (2009.01)
*H04B 7/00* (2006.01)
*H04B 7/212* (2006.01)
*H04M 3/00* (2006.01)

(52) U.S. Cl.
USPC ........... 455/435.1; 455/435.2; 455/435.3; 455/432.2; 455/433; 455/441; 455/436; 455/525; 455/419; 455/450; 370/321; 370/331; 370/328

(58) Field of Classification Search
USPC ............... 455/432.2, 433, 435.1–435.3, 458
See application file for complete search history.

(56) References Cited

U.S. PATENT DOCUMENTS 6,823,192 B2   11/2004  Jou et al.
7,181,218 B2 *  2/2007  Ovesjo et al. .............. 455/436
(Continued)

FOREIGN PATENT DOCUMENTS

CN   1998164 A    7/2007
CN   101043743 A   9/2007
(Continued)

OTHER PUBLICATIONS

3GPP TS 25.331 V8.7.0 (Jun. 2009).*
(Continued)

*Primary Examiner* — Kent Chang
*Assistant Examiner* — Nathan Brittingham
(74) *Attorney, Agent, or Firm* — Abdollah Katbab

(57) ABSTRACT

An apparatus and method comprising determining if the timing of a registration system information (RSI) or a paging occasion occurs first; if the paging occasion occurs first, checking for a page and answering the page on the target cell after collecting system information (SI) if the page exists; or if the timing of the RSI occurs first: reading RSI and obtaining a registration area indicator of the target cell; determining if the registration area indicators of a source cell and of the target cell are the same; if not, determining whether checking the page in the source cell would overlap with receiving SI from the target cell; if overlap, or if same, collect SI and monitor a paging channel in the target cell; or if no overlap, checking for the page in the source cell, and if no page, collect SI and monitor the paging channel in the target cell.

80 Claims, 5 Drawing Sheets

(56) References Cited

U.S. PATENT DOCUMENTS

| | | | |
|---|---|---|---|
| 7,466,683 B2 * | 12/2008 | Bassompierre et al. | 370/350 |
| 7,477,896 B2 * | 1/2009 | Rick et al. | 455/436 |
| 7,480,519 B2 * | 1/2009 | Jeong et al. | 455/525 |
| 8,078,174 B2 | 12/2011 | Narang et al. | |
| 2005/0014307 A1 | 1/2005 | Shiraishi et al. | |
| 2005/0073977 A1 | 4/2005 | Vanghi et al. | |
| 2006/0040655 A1 | 2/2006 | Kim | |
| 2007/0238452 A1 * | 10/2007 | Haviala | 455/418 |
| 2008/0268845 A1 * | 10/2008 | Wu et al. | 455/436 |
| 2009/0149185 A1 * | 6/2009 | Narasimha | 455/442 |
| 2009/0270097 A1 * | 10/2009 | Gallagher et al. | 455/435.1 |

FOREIGN PATENT DOCUMENTS

| | | |
|---|---|---|
| CN | 101052203 A | 10/2007 |
| CN | 101132614 A | 2/2008 |
| JP | 2006087078 A | 3/2006 |
| JP | 2010516071 A | 5/2010 |
| JP | 2011527161 A | 10/2011 |
| TW | 200709706 | 3/2007 |
| TW | 200807939 A | 2/2008 |
| WO | 02060212 A2 | 8/2002 |
| WO | WO2008040448 A1 | 4/2008 |
| WO | WO2008155739 | 12/2008 |

OTHER PUBLICATIONS

Kasera, Sumit, Narang, Nishit, 3G Mobile Noetworks, Architecture, Protocols, and Procedures, 2005, McGraw-Hill, pp. 58-59.*

3rd Generation Partnership Project; "Technical Specification Group Radio Access Network; Evolved Universal Terrestrial Radio Access (E-UTRA) Radio Resource Control (RRC); Protocol specification" 3GPP TS 36.331 V8.6.0 (Release 8) (Jun. 2009).

3rd Generation Partnership Project; "Technical Specification Group Radio Access Network; Evolved Universal Terrestrial Radio Access (E-UTRA); Requirements for support of radio resource management" 3GPP TS 36.133 V9.0.0 (Release 9), pp. 1-259 (May 2009).

3rd Generation Partnership Project; "Technical Specification Group Radio Access Network; Requirements for support of radio resource management (FDD)" 3GPP TS 25.133 V9.0.0 (Release 9), pp. 1-225 (May 2009).

ETSI TS 125 331 Universal Mobile Telecommunications System (UMTS); Radio Resource Control (RRC); Protocol specification, 3GPP TS 25.331 version 8.7.0 Release 8, Jul. 2009.

International Search Report and Written Opinion—PCT/US2009/049398, International Search Authority—European Patent Office—Oct. 22, 2009.

Taiwan Search Report—TW098122280—TIPO—Oct. 4, 2012.

* cited by examiner

APPARATUS AND METHOD FOR IMPROVING MOBILE TERMINATED CELL SETUP PERFORMANCE DURING INTER-FREQUENCY CELL RESELECTION

CLAIM OF PRIORITY UNDER 35 U.S.C. §119

The present application for patent claims priority to Provisional Application No. 61/077,258 entitled "Method and Apparatus for Improving Mobile-Terminated Call Setup Performance During Inter-Frequency Cell Reselection" filed Jul. 1, 2008, and assigned to the assignee hereof and hereby expressly incorporated by reference herein.

FIELD

This disclosure relates generally to apparatus and methods for mobile terminated call set-up performance. More particularly, the disclosure relates to improving mobile-terminated call set-up performance during inter-frequency cell reselection.

BACKGROUND

In a wireless communication system which utilizes cells to increase system capacity, a mobile device, also known as User Equipment (UE), in idle or sleep mode wakes up at regular time intervals, known as paging occasions. The paging occasions are used by the UE to monitor the paging channel (PCH) of the camping cell and to measure the quality of the camping and neighboring cells. Reselection is the process of transitioning from a source cell to a target cell in a cellular wireless communications system. During reselection to another cell, the UE reads the essential system information, for example, System Information Blocks (SIBs), on the Broadcast Channel (BCH) of the target cell. For example, SIBs contain groups of related system information sent by the wireless network to the various UEs for operational management.

The behavior of the UE for PCH monitoring while collecting system information is not specified in the applicable wireless standards. In one example, the UE has the option to either monitor the paging channel (e.g., PCH) at the same time as it reads the system information (e.g., SIBs) on a broadcast channel (e.g., BCH) or to postpone the monitoring of the paging channel until a particular time interval, (e.g., no more than 50 ms) after all essential system information are collected. In the latter case, the mobile-terminated (MT) call setup performance will be impacted in terms of call set-up time. Also, the user may not be reached if the page arrives during the skipped paging occasions. Simultaneous monitoring of the PCH on the source cell and BCH on the target cell may be implemented by the UE in the case of intra-frequency cell reselection. However, in the case of inter-frequency cell reselection, such simultaneous monitoring may not be possible since the source and the target cell are on different frequency carriers. Instead, the UE typically skips the PCH monitoring until all the essential system information is collected on the target cell. Although this behavior is standard-compliant, it can have negative impact on the mobile-terminated (MT) call setup time and user reachability. This performance degradation is due to the time-consuming system information collection, especially in case of long discontinuous reception (DRX) cycles and sub-optimal RF conditions or both. Mobile users that often cross inter-frequency cell boundaries will be particularly impacted. The present disclosure addresses the problem of PCH monitoring while collecting system information and reduces the time during which UE cannot receive pages during inter-frequency cell reselection.

SUMMARY

Disclosed is an apparatus and method improving mobile-terminated call set-up performance during inter-frequency cell reselection. According to one aspect, a method for improving mobile-terminated call set-up performance during inter-frequency cell reselection comprising determining if the timing of a registration system information or a paging occasion occurs first; if the paging occasion occurs first, then checking for a page on a target cell, and answering the page on the target cell after collecting system information if the page exists; or if the timing of the registration system information occurs first, then a) reading registration system information and obtaining a registration area indicator of the target cell; b) determining if the registration area indicator of a source cell and the registration area indicator of the target cell are the same; c) determining whether checking the page in the source cell would overlap with receiving system information from the target cell if the registration area indicator of the source cell and the registration area indicator of the target cell are not the same; d) if there is overlap, or if the registration area indicator of the source cell and the registration area indicator of the target cell are the same, continuing to collect system information and monitoring at least one paging channel in the target cell; or e) if there is no overlap, checking for the page in the source cell, and if there is no page, then continuing to collect system information and monitoring at least one paging channel in the target cell.

According to another aspect, a user equipment for improving mobile-terminated call set-up performance during inter-frequency cell reselection, the user equipment comprising a processor and a memory, the memory containing program code executable by the processor for performing the following: determining if the timing of a registration system information or a paging occasion occurs first; if the paging occasion occurs first, then checking for a page on a target cell, and answering the page on the target cell after collecting system information if the page exists; or if the timing of the registration system information occurs first, then performing steps a) through e): a) reading registration system information and obtaining a registration area indicator of the target cell; b) determining if the registration area indicator of a source cell and the registration area indicator of the target cell are the same; c) determining whether checking the page in the source cell would overlap with receiving system information from the target cell if the registration area indicator of the source cell and the registration area indicator of the target cell are not the same; d) if there is overlap, or if the registration area indicator of the source cell and the registration area indicator of the target cell are the same, continuing to collect system information and monitoring at least one paging channel in the target cell; or e) if there is no overlap, checking for the page in the source cell, and if there is no page, then continuing to collect system information and monitoring at least one paging channel in the target cell.

According to another aspect, a wireless communication device for improving mobile-terminated call set-up performance during inter-frequency cell reselection comprising means for determining if the timing of a registration system information or a paging occasion occurs first; means for checking for a page on the target cell and answering the page on the target cell after collecting system information if the page exists, wherein the means for checking and answering is executed if the paging occasion occurs first; and means for performing steps a) through e), wherein the means for performing is executed if the timing of the registration system information occurs first: a) reading registration system information and obtaining a registration area indicator of the target cell; b) determining if the registration area indicator of a source cell and the registration area indicator of the target cell are the same; c) determining whether checking the page in the source cell would overlap with receiving system information from the target cell if the registration area indicator of the source cell and the registration area indicator of the target cell are not the same; d) if there is overlap, or if the registration area indicator of the source cell and the registration area indicator of the target cell are the same, continuing to collect system information and monitoring at least one paging channel in the target cell; or e) if there is no overlap, checking for the page in the source cell, and if there is no page, then continuing to collect system information and monitoring at least one paging channel in the target cell.

According to another aspect, a computer-readable medium having a computer program comprising instructions, which when executed by at least one processor, operates to improve mobile-terminated call set-up performance during inter-frequency cell reselection, the computer program comprising: instructions for determining if the timing of a registration system information or a paging occasion occurs first; instructions for checking for a page on the target cell, and answering the page on the target cell after collecting system information if the page exists, wherein the instructions for checking and answering are executed if the paging occasion occurs first; and instructions for performing steps a) through e), wherein the instructions for performing are executed if the timing of the registration system information occurs first: a) reading registration system information and obtaining a registration area indicator of the target cell; b) determining if the registration area indicator of a source cell and the registration area indicator of the target cell are the same; c) determining whether checking the page in the source cell would overlap with receiving system information from the target cell if the registration area indicator of the source cell and the registration area indicator of the target cell are not the same; d) if there is overlap, or if the registration area indicator of the source cell and the registration area indicator of the target cell are the same, continuing to collect system information and monitoring at least one paging channel in the target cell; or e) if there is no overlap, checking for the page in the source cell, and if there is no page, then continuing to collect system information and monitoring at least one paging channel in the target cell.

Advantages of the present disclosure include reducing or avoiding missing pages, improving user experience and improving mobile-terminated call set-up performance during inter-frequency cell reselection.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
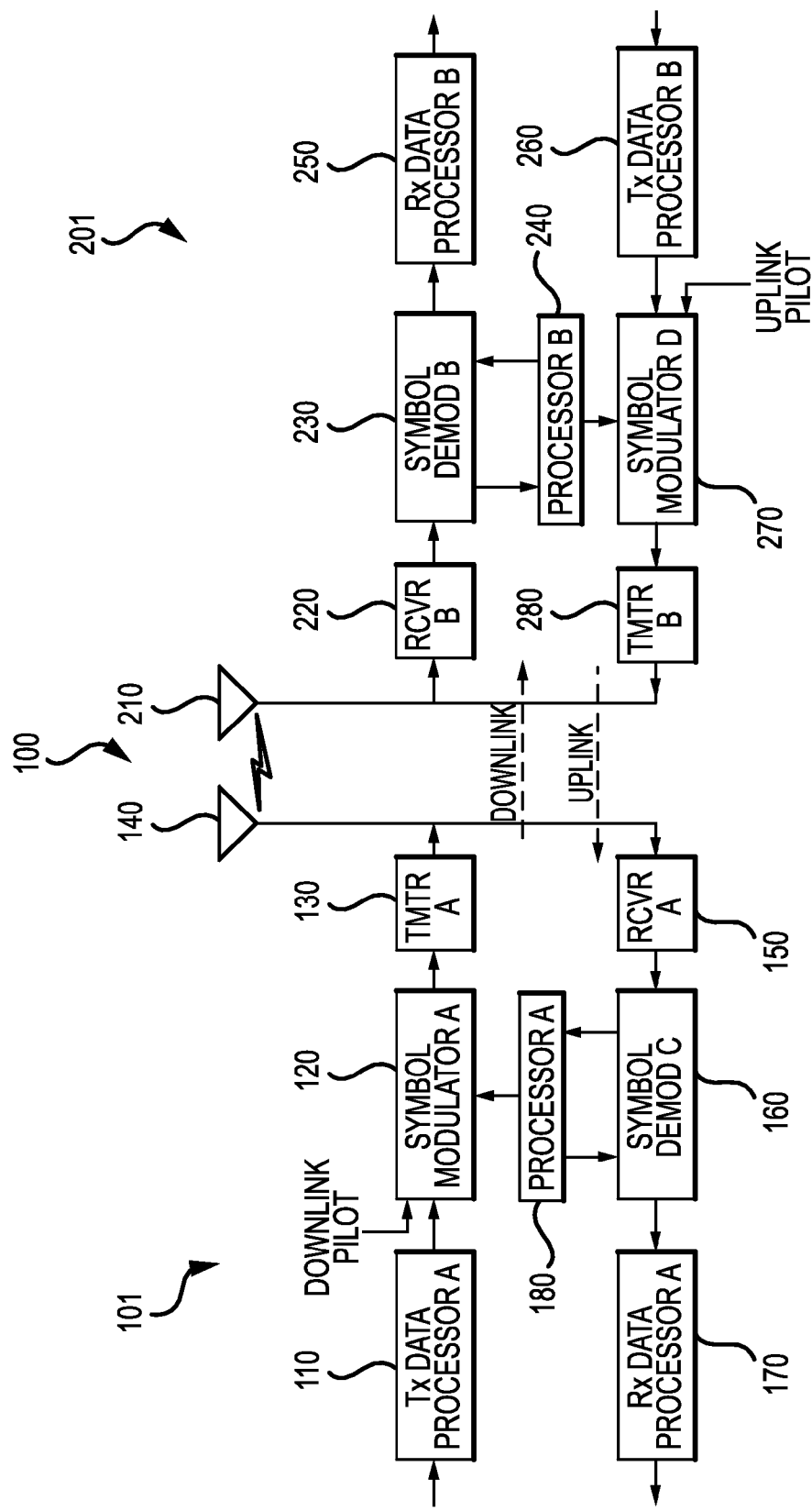
FIG. 1 is a block diagram illustrating an example access node/UE system.

FIG. 1 is a block diagram illustrating an example access node/UE system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node 101 (e.g., base station) and a user equipment or UE 201 (e.g., wireless communication device). In the downlink leg, the access node 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (a.k.a. base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
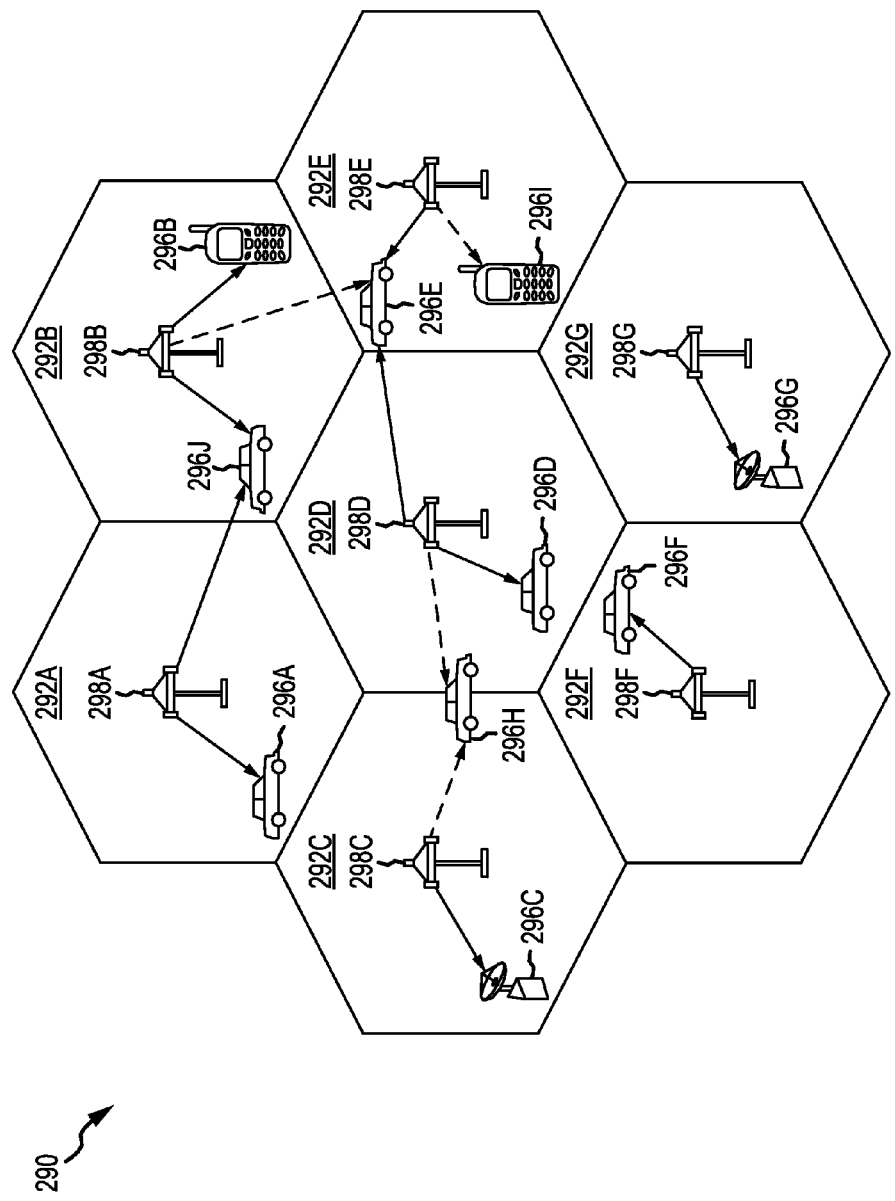
FIG. 2 illustrates an example of a wireless communications system 290 that supports a plurality of users.

FIG. 2 illustrates an example of a wireless communications system 290 that supports a plurality of users. In FIG. 2, reference numerals 292A to 292G refer to cells, reference numerals 298A to 298G refer to base stations (BS) or base transceiver station (BTS) and reference numerals 296A to 296J refer to access User Equipments (UE). Cell size may vary. Any of a variety of algorithms and methods may be used to schedule transmissions in system 290. System 290 provides communication for a number of cells 292A through 292G, each of which is serviced by a corresponding base station 298A through 298G, respectively.

The present disclosure for improving mobile-terminated call set-up performance during inter-frequency cell reselection may be applicable to various radio access technologies employed by many wireless communication systems, including but not limited to, UMTS (universal mobile telecommunication system), WCDMA (wideband code division multiple access), GSM (Global System for Mobile communications), GSM/GPRS (General Packet Radio Service/EDGE (Enhanced Data Rates for GSM Evolution), LTE (Long Term Evolution), IS-95 (interim standard 95), cdma2000, EVDO (evolution data optimized) or UMB (ultra mobile broadband), etc. In one aspect, the present disclosure is applicable to WiMax (Worldwide Interoperability for Microwave Access). Although the present disclosure describes specific examples using terminologies used in UMTS and/or LTE, one skilled in the art would understand that these examples given are not exclusive and may be translated to equivalent terminology or concepts of other access technologies and wireless communication systems without affecting the spirit or scope of the present disclosure.

In one aspect, the PCH on the target cell is monitored if the source cell and the target cell are in the same registration area. A registration area is a collection of cells within a cellular coverage area where mobile device can be simultaneously paged by the network. In one aspect, the registration area includes a location area, a routing area and/or a tracking area. The identity of the registration area is broadcast in the Registration System information, and may include location area identity (LAI), routing area identity (RAI) and/or tracking area identity (TAI). If the UE does not know which registration area the target cell is in before the paging occasion on the target cell occurs, an initial step is to check blindly for the page on the PCH of the target cell using the same parameters as the source cell. For example, the UE checks for the page on the PCH on the target cell and checks for the page on the PCH on the source cell. If the registration area is different, the UE tunes to the source cell and transmission frequency and checks the page on the source cell if there is an inter-system information gap of sufficient length in the target cell to do so.

In one aspect, the mobile terminated call setup time and user un-reachability during inter-frequency cell reselection is reduced. Cell reselection permits the UE to select a more suitable cell for camping. The UE minimizes the time until receiving an incoming page during inter-frequency reselection by monitoring the paging channel (e.g., Paging Indicator Channel (PICH) in UMTS) at the first available opportunity in the target cell or the source cell. The improvement ranges from one discontinuous reception (DRX) cycle time to multiple DRX cycle times. For example, in Universal Mobile Telecommunications System (UMTS) networks, the DRX cycle time ranges between 640 ms to 2.56 seconds. The reduction in call setup time particularly improves the experience of users who often cross inter-frequency cell boundaries.

In one example, for UMTS, the PICH is a Paging Indicator Channel with 20 ms frames which contain a configurable number, for example 16, of Paging Indicators (PI). Each UE group is assigned a specific PI on the PICH. Each UE checks the status of its PI on the Paging Indicator Channel (PICH) when it wakes up during its DRX cycle. In one example, the PICH tells the phone that it should check for a page via a binary flag. And, the paging channel (e.g., PCH) carries the actual paging data. The UE demodulates the paging channel in the next frame if its PI is set to one to check if it is being paged. Otherwise, the UE does not check the paging channel if its PI is set to zero.

Figure 3:
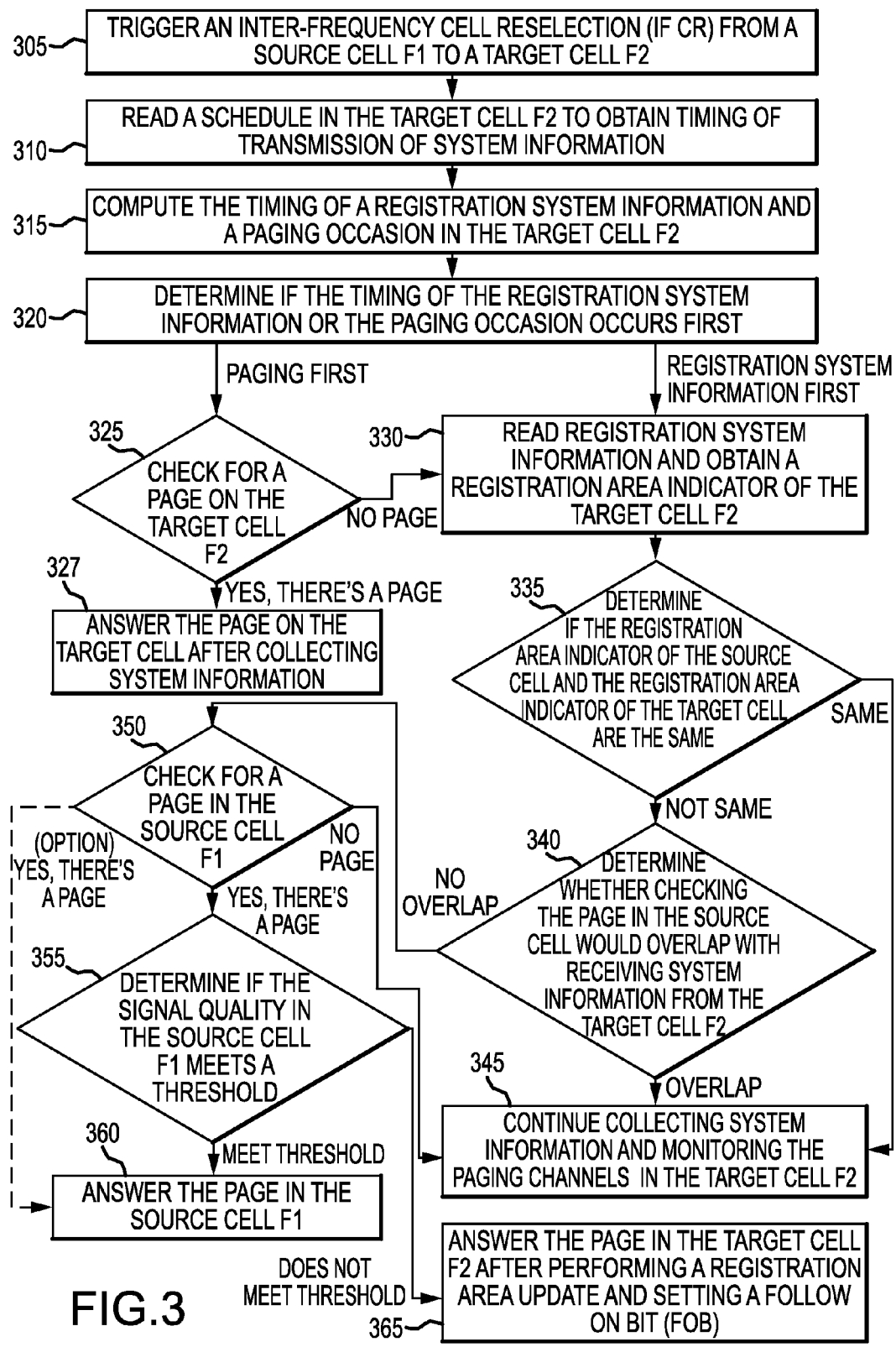
FIG. 3 illustrates an example flow diagram for improving mobile-terminated call set-up performance during inter-frequency cell reselection.

FIG. 3 illustrates an example flow diagram for improving mobile-terminated call set-up performance during inter-frequency cell reselection. In block 305, trigger an inter-frequency cell reselection (IF CR) from a source cell F1 to a target cell F2. Following block 305, in block 310, read a schedule in the target cell F2 to obtain timing of transmission of system information. The schedule is a schedule of transmission of system information on the broadcast channel of a cell. In one example, the schedule is a Master Information Block (MIB). In one example, the step of reading the schedule in the target cell F2 includes obtaining a System Frame Number (SFN). And, in one example, the System Frame Number (SFN) obtained in block 310 is used to compute the timing of a Registration System Information and a paging occasion in the target cell in block 315. In particular, the SFN can be used this way in the UMTS and LTE systems.

Next, in block 315, compute the timing of a Registration System Information and a paging occasion in the target cell F2. In one aspect, the Registration System Information carries the identity of a registration area (for example, a location area, a routing area and/or a tracking area) of a serving cell on a broadcast channel. In one example, the Registration System Information carries the identity of the location and/or tracking area (for example, a SIB1 in a UMTS system or in a LTE system). In one example, the step in block 315 is performed by the UE. Following block 315, in block 320, determine if the timing of the Registration System Information or the paging occasion occurs first. In one aspect, the step of block 320 is performed using relevant system parameters of the source cell, for example, assuming that the parameters are unchanged between source and target cell. In one example, the step in block 320 is performed by the UE. If the Registration System Information occurs first, proceed to block 330. If the paging occasion occurs first, proceed to block 325 and check for a page on the target cell F2. If there is a page on the target cell F2, proceed to block 327. In block 327, answer the page on the target cell after collecting system information. In one example, the steps in blocks 325 and 327 are performed by the UE.

If there is no page on the target cell F2, proceed to block 330. In block 330, read Registration System Information and obtain a Registration Area Indicator of the target cell F2 and proceed to block 335. In one aspect, the Registration Area Indicator pertains to at least one of the following identifiers: a) a Location Area Identity (LAI) which is used in UMTS; b) a Routing Area Identity (RAI) which is used in UMTS; and/or c) a Tracking Area identity (TAI) which is used in LTE. In one aspect, these three identifiers are contained inside the Registration System Information, (e.g., SIB1 in UMTS or LTE system). In UMTS, a UE connected to a circuit-switched (CS) network will use LAI whereas a UE connected to packet-switched (PS) network will use RAI. A UE can be connected to both circuit-switched (CS) and packet-switched (PS) networks at the same time and use both LAI and RAI. In LTE, the UE uses TAI since there is no circuit-switched (CS) network in LTE. In one example, the step in block 330 is performed by the UE. In block 335, determine if the Registration Area Indicator of the source cell and the Registration Area Indicator of the target cell are the same. If the two Registration Area Indicators are the same value, proceed to block 345. If the two Registration Area Indicators are not the same value, proceed to block 340.

In block 340, determine whether checking the page in the source cell would overlap with receiving system information from the target cell F2. In one aspect, system information is information pertaining to a wireless communication system defined in wireless communication standards (for example, 3GPP TS 25.331 for UMTS and 3GPP TS 36.331 for LTE), wherein the standards classify particular system information as essential and/or nonvalid. In one aspect, the system information received from the target cell comprises nonvalid system information from essential system information. If there is overlap, proceed to block 345. In one example, the steps in blocks 335 and 340 are performed by the UE. In block 345, continue collecting system information and monitoring the paging channels in the target cell F2. In a UMTS system, the paging channels are the Paging Indicator Channel (PICH) and the Paging Channel (PCH). In a cdma2000 system, the paging channels include a Quick Paging Channel and a Paging Channel. In a LTE system, there is no PICH, and there is only a Paging Channel (PCH).

If there is no overlap, proceed to block 350. In block 350, check for a page in the source cell F1. In one example, the step in block 350 is performed by the UE. If there is no page in the source cell F2, proceed to block 345. If there is a page in the source cell F1, proceed to block 355 to determine if the signal quality in the source cell F1 meets a threshold. In one example, the signal quality and threshold could be measured as received signal strength indication (RSSI), bit error rate (BER), frame error rate (FER), bit energy/noise density ratio ($E_b/N_0$), fade rate, etc. One skilled in the art would understand that the various metrics given as example for the signal quality and threshold should not be construed as limiting. And, it is understood that other example metrics can be used without affecting the spirit or scope of the present disclosure. Also, one skilled in the art would understand that the value of the threshold could depend on many factors, including but not limited to, system parameters, channel conditions, design and operator choices, etc., without affecting the spirit or scope of the present disclosure.

If the signal quality meets the threshold, then proceed to block 360 to answer the page in the source cell F1. If the signal quality does not meet the threshold, proceed to block 365. In block 365, answer the page in the target cell F2 after performing a Registration Area Update and setting a Follow On Bit (FOB). In one example, the steps in blocks 360 and 365 are performed by the UE.

In one option, following block 350, if there is a page, in the source cell F1, proceed on to block 360 to answer the page in the source cell F1.

One skilled in the art would understand that the present disclosure, including the example flow diagram of FIG. 3, is applicable to various access technologies used in a variety of wireless communication systems, including but not limited to UMTS, LTE, cdma2000 and EVDO, etc. One skilled in the art would understand that terminologies may differ in different access technologies and wireless communication systems without affecting the spirit or scope of the present disclosure. For example, in a LTE system, the term Location Area (LA) is replaced by Tracking Area (TA), the term Location Area Update (LAU) is replaced by Tracking Area Update (TAU), and the term Location Area Indicator is replaced by Tracking Area Indicator (TAI). Additionally, it is understood by one skilled in the art that the LTE system also incorporates the same concepts for SIB and MIB. In addition, for the LTE system, there is no PICH since the UE reads the paging channel directly.

One skilled in the art would understand that the steps disclosed in the example flow diagram in FIG. 3 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 4:
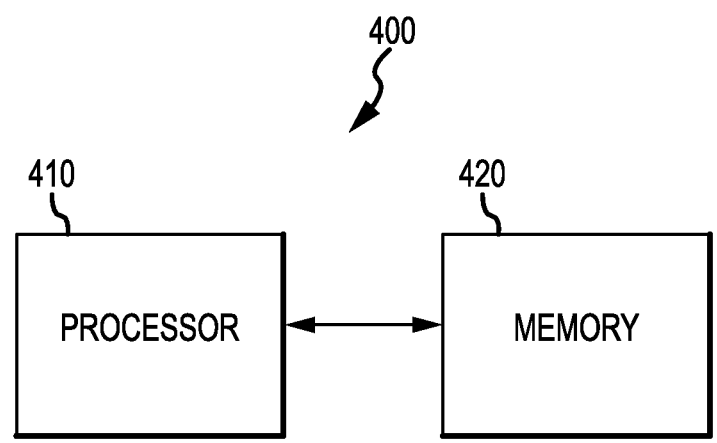
FIG. 4 illustrates an example of a device comprising a processor in communication with a memory for executing the processes for improving mobile-terminated call set-up performance during inter-frequency cell reselection.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 4 illustrates an example of a device 400 comprising a processor 410 in communication with a memory 420 for executing the processes for improving mobile-terminated call set-up performance during inter-frequency cell reselection. In one example, the device 400 is used to implement the algorithm illustrated in FIG. 3. In one aspect, the memory 420 is located within the processor 410. In another aspect, the memory 420 is external to the processor 410. In one aspect, the processor includes circuitry for implementing or performing the various flow diagrams, logical blocks and/or modules described herein.

Figure 5:
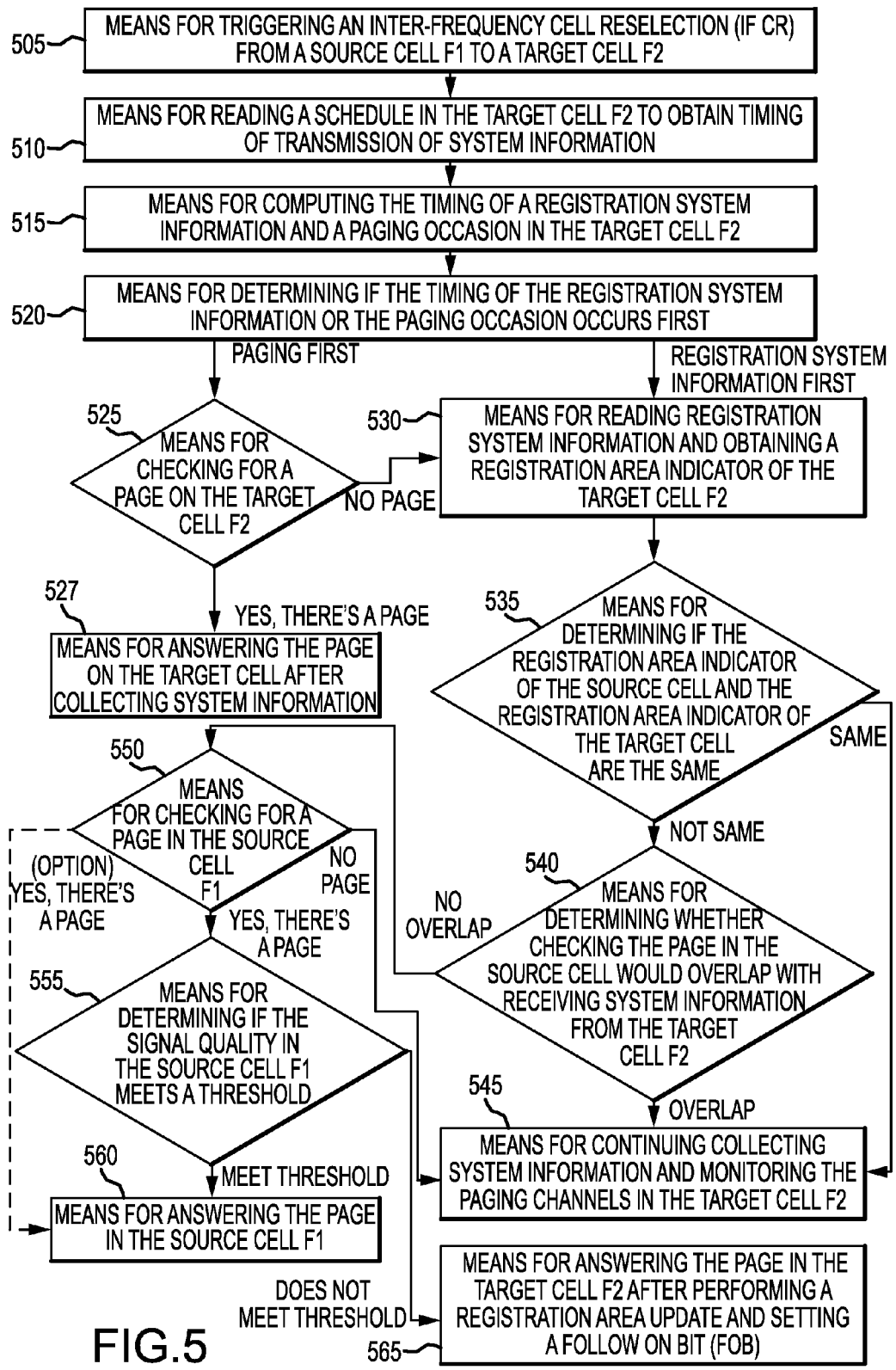
FIG. 5 illustrates an example of a device suitable for improving mobile-terminated call set-up performance during inter-frequency cell reselection.

FIG. 5 illustrates an example of a device 500 suitable for improving mobile-terminated call set-up performance during inter-frequency cell reselection. In one aspect, the device 500 is implemented by at least one processor comprising one or more modules configured to provide different aspects of improving mobile-terminated call set-up performance during inter-frequency cell reselection as described herein in blocks 505, 510, 515, 520, 525, 527, 530, 535, 540, 545, 550, 555, 560 and 565. In one aspect, each module comprises hardware, firmware, software, or any combination thereof. In one aspect, the device 500 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for improving mobile-terminated call set-up performance during inter-frequency cell reselection comprising:
   determining if the timing of a registration system information or a paging occasion occurs first;
   if the paging occasion occurs first, then checking for a page on a target cell, and answering the page on the target cell after collecting system information if the page exists; or
   if the timing of the registration system information occurs first, then
   a) reading registration system information and obtaining a registration area indicator of the target cell;
   b) determining if the registration area indicator of a source cell and the registration area indicator of the target cell are the same;
   c) determining whether checking the page in the source cell would overlap with receiving system information from the target cell if the registration area indicator of the source cell and the registration area indicator of the target cell are not the same;
   d) if there is overlap, or if the registration area indicator of the source cell and the registration area indicator of the target cell are the same, continuing to collect system information and monitoring at least one paging channel in the target cell; or
   e) if there is no overlap, checking for the page in the source cell, and if there is no page, then continuing to collect system information and monitoring at least one paging channel in the target cell.

2. The method of claim 1 wherein the system information received from the target cell comprises nonvalid system information from essential system information.

3. The method of claim 1 further comprising determining if the signal quality in the source cell meets a threshold and answering the page in the source cell.

4. The method of claim 1 further comprising determining if the signal quality in the source cell meets a threshold and answering the page in the target cell after performing a registration area update and setting a Follow On Bit (FOB).

5. The method of claim 1 further comprising computing the timing of the registration system information and the paging occasion in the target cell.

6. The method of claim 5 further comprising reading a schedule in the target cell to obtain timing of transmission of the system information.

7. The method of claim 6 wherein the schedule is a Master Information Block (MIB).

8. The method of claim 6 further comprising obtaining a System Frame Number (SFN).

9. The method of claim 8 further comprising using the System Frame Number (SFN) for computing the timing of the registration system information and the paging occasion in the target cell.

10. The method of claim 6 further comprising triggering an inter-frequency cell reselection (IF CR) from the source cell to the target cell.

11. The method of claim 1 wherein the inter-frequency cell reselection is in a universal mobile telecommunication system (UMTS) and the registration system information is a SIB 1.

12. The method of claim 11 wherein the registration area indicator is a location area identity (LAI).

13. The method of claim 12 wherein a user equipment for performing the steps of claim 1 is connected to a circuit-switched (CS) network.

14. The method of claim 11 wherein the registration area indicator is a routing area identity (RAI).

15. The method of claim 14 wherein a user equipment for performing the steps of claim 1 is connected to a packet-switched (PS) network.

16. The method of claim 15 further comprising a second registration area indicator which is a location area identity (LAI).

17. The method of claim 16 wherein the user equipment is also connected to a circuit-switched (CS) network.

18. The method of claim 1 wherein the inter-frequency cell reselection is in a Long Term Evolution (LTE) system and the registration system information is a SIB1.

19. The method of claim 18 wherein the registration area indicator is a tracking area identity (TAI).

20. The method of claim 1 wherein the inter-frequency cell reselection is in a cdma2000 system or a WiMax system.

21. A user equipment for improving mobile-terminated call set-up performance during inter-frequency cell reselection, the user equipment comprising a processor and a memory, the memory containing program code executable by the processor for performing the following:
   determining if the timing of a registration system information or a paging occasion occurs first;
   if the paging occasion occurs first, then checking for a page on a target cell, and answering the page on the target cell after collecting system information if the page exists; or
   if the timing of the registration system information occurs first, then performing steps a) through e):
   a) reading registration system information and obtaining a registration area indicator of the target cell;

b) determining if the registration area indicator of a source cell and the registration area indicator of the target cell are the same;
c) determining whether checking the page in the source cell would overlap with receiving system information from the target cell if the registration area indicator of the source cell and the registration area indicator of the target cell are not the same;
d) if there is overlap, or if the registration area indicator of the source cell and the registration area indicator of the target cell are the same, continuing to collect system information and monitoring at least one paging channel in the target cell; or
e) if there is no overlap, checking for the page in the source cell, and if there is no page, then continuing to collect system information and monitoring at least one paging channel in the target cell.

22. The user equipment of claim 21 wherein the system information received from the target cell comprises nonvalid system information from essential system information.

23. The user equipment of claim 21 wherein the memory further comprising program code for determining if the signal quality in the source cell meets a threshold and answering the page in the source cell.

24. The user equipment of claim 21 wherein the memory further comprising program code for determining if the signal quality in the source cell meets a threshold and answering the page in the target cell after performing a registration area update and setting a Follow On Bit (FOB).

25. The user equipment of claim 21 wherein the memory further comprising program code for computing the timing of the registration system information and the paging occasion in the target cell.

26. The user equipment of claim 25 wherein the memory further comprising program code for reading a schedule in the target cell to obtain timing of transmission of the system information.

27. The user equipment of claim 26 wherein the schedule is a Master Information Block (MIB).

28. The user equipment of claim 26 wherein the memory further comprising program code for obtaining a System Frame Number (SFN).

29. The user equipment of claim 28 wherein the memory further comprising program code for using the System Frame Number (SFN) for computing the timing of the registration system information and the paging occasion in the target cell.

30. The user equipment of claim 26 wherein the memory further comprising program code for triggering an inter-frequency cell reselection (IF CR) from the source cell to the target cell.

31. The user equipment of claim 21 wherein the user equipment is part of a universal mobile telecommunication system (UMTS) and the registration system information is a SIB1.

32. The user equipment of claim 31 wherein the registration area indicator is a location area identity (LAI).

33. The user equipment of claim 32 wherein the user equipment is connected to a circuit-switched (CS) network.

34. The user equipment of claim 31 wherein the registration area indicator is a routing area identity (RAI).

35. The user equipment of claim 34 wherein the user equipment is connected to a packet-switched (PS) network.

36. The user equipment of claim 35 wherein the registration area indicator further comprises a second registration area indicator which is a location area identity (LAI).

37. The user equipment of claim 36 wherein the user equipment is also connected to a circuit-switched (CS) network.

38. The user equipment of claim 21 wherein the user equipment is part of a Long Term Evolution (LTE) system and the registration system information is a SIB1.

39. The user equipment of claim 38 wherein the registration area indicator is a tracking area identity (TAI).

40. The user equipment of claim 21 wherein the user equipment is part of a cdma2000 system or a WiMax system.

41. A wireless communication device for improving mobile-terminated call set-up performance during inter-frequency cell reselection comprising:
    means for determining if the timing of a registration system information or a paging occasion occurs first;
    means for checking for a page on the target cell and answering the page on the target cell after collecting system information if the page exists, wherein the means for checking and answering is executed if the paging occasion occurs first; and
    means for performing steps a) through e), wherein the means for performing is executed if the timing of the registration system information occurs first:
    a) reading registration system information and obtaining a registration area indicator of the target cell;
    b) determining if the registration area indicator of a source cell and the registration area indicator of the target cell are the same;
    c) determining whether checking the page in the source cell would overlap with receiving system information from the target cell if the registration area indicator of the source cell and the registration area indicator of the target cell are not the same;
    d) if there is overlap, or if the registration area indicator of the source cell and the registration area indicator of the target cell are the same, continuing to collect system information and monitoring at least one paging channel in the target cell; or
    e) if there is no overlap, checking for the page in the source cell, and if there is no page, then continuing to collect system information and monitoring at least one paging channel in the target cell.

42. The wireless communication device of claim 41 wherein the system information received from the target cell comprises nonvalid system information from essential system information.

43. The wireless communication device of claim 41 further comprising means for determining if the signal quality in the source cell meets a threshold and answering the page in the source cell.

44. The wireless communication device of claim 41 further comprising means for determining if the signal quality in the source cell meets a threshold and answering the page in the target cell after performing a registration area update and setting a Follow On Bit (FOB).

45. The wireless communication device of claim 41 further comprising means for computing the timing of the registration system information and the paging occasion in the target cell.

46. The wireless communication device of claim 45 further comprising means for reading a schedule in the target cell to obtain timing of transmission of the system information.

47. The wireless communication device of claim 46 wherein the schedule is a Master Information Block (MIB).

48. The wireless communication device of claim 46 further comprising means for obtaining a System Frame Number (SFN).

49. The wireless communication device of claim 48 further comprising means for using the System Frame Number (SFN) for computing the timing of the registration system information and the paging occasion in the target cell.

50. The wireless communication device of claim 46 further comprising means for triggering an inter-frequency cell reselection (IF CR) from the source cell to the target cell.

51. The wireless communication device of claim 41 wherein the wireless communication device is part of a universal mobile telecommunication system (UMTS) and the registration system information is a SIB1.

52. The wireless communication device of claim 51 wherein the registration area indicator is a location area identity (LAI).

53. The wireless communication device of claim 52 wherein the wireless communication device is connected to a circuit-switched (CS) network.

54. The wireless communication device of claim 51 wherein the registration area indicator is a routing area identity (RAI).

55. The wireless communication device of claim 54 wherein the wireless communication device is connected to a packet-switched (PS) network.

56. The wireless communication device of claim 55 wherein the registration area indicator further comprises a second registration area indicator which is a location area identity (LAI).

57. The wireless communication device of claim 56 wherein the wireless communication device is also connected to a circuit-switched (CS) network.

58. The wireless communication device of claim 51 wherein the wireless communication device is part of a Long Term Evolution (LTE) system and the registration system information is a SIB1.

59. The wireless communication device of claim 58 wherein the registration area indicator is a tracking area identity (TAI).

60. The wireless communication device of claim 51 wherein the wireless communication device is part of a cdma2000 system or a WiMax system.

61. A non-transitory computer-readable medium having a computer program comprising instructions, which when executed by at least one processor, operates to improve mobile-terminated call set-up performance during inter-frequency cell reselection, the computer program comprising:
   instructions for determining if the timing of a registration system information or a paging occasion occurs first;
   instructions for checking for a page on the target cell, and answering the page on the target cell after collecting system information if the page exists, wherein the instructions for checking and answering are executed if the paging occasion occurs first; and
   instructions for performing steps a) through e), wherein the instructions for performing are executed if the timing of the registration system information occurs first:
   a) reading registration system information and obtaining a registration area indicator of the target cell;
   b) determining if the registration area indicator of a source cell and the registration area indicator of the target cell are the same;
   c) determining whether checking the page in the source cell would overlap with receiving system information from the target cell if the registration area indicator of the source cell and the registration area indicator of the target cell are not the same;
   d) if there is overlap, or if the registration area indicator of the source cell and the registration area indicator of the target cell are the same, continuing to collect system information and monitoring at least one paging channel in the target cell; or
   e) if there is no overlap, checking for the page in the source cell, and if there is no page, then continuing to collect system information and monitoring at least one paging channel in the target cell.

62. The computer-readable medium of claim 61 wherein the system information received from the target cell comprises nonvalid system information from essential system information.

63. The computer-readable medium of claim 61 further comprising instructions for determining if the signal quality in the source cell meets a threshold and answering the page in the source cell.

64. The computer-readable medium of claim 61 further comprising instructions for determining if the signal quality in the source cell meets a threshold and answering the page in the target cell after performing a registration area update and setting a Follow On Bit (FOB).

65. The computer-readable medium of claim 61 further comprising instructions for computing the timing of the registration system information and the paging occasion in the target cell.

66. The computer-readable medium of claim 65 further comprising instructions for reading a schedule in the target cell to obtain timing of transmission of the system information.

67. The computer-readable medium of claim 66 wherein the schedule is a Master Information Block (MIB).

68. The computer-readable medium of claim 66 further comprising means for obtaining a System Frame Number (SFN).

69. The computer-readable medium of claim 68 further comprising means for using the System Frame Number (SFN) for computing the timing of the registration system information and the paging occasion in the target cell.

70. The computer-readable medium of claim 66 further comprising instructions for triggering an inter-frequency cell reselection (IF CR) from the source cell to the target cell.

71. The computer-readable medium of claim 61 wherein the computer-readable medium is used in a universal mobile telecommunication system (UMTS) and the registration system information is a SIB1.

72. The computer-readable medium of claim 71 wherein the registration area indicator is a location area identity (LAI).

73. The computer-readable medium of claim 72 wherein the computer-readable medium is used in connection to a circuit-switched (CS) network.

74. The computer-readable medium of claim 71 wherein the registration area indicator is a routing area identity (RAI).

75. The computer-readable medium of claim 74 wherein the computer-readable medium is used in connection to a packet-switched (PS) network.

76. The computer-readable medium of claim 75 wherein the registration area indicator further comprises a second registration area indicator which is a location area identity (LAI).

77. The computer-readable medium of claim 76 wherein the wireless communication device is also connected to a circuit-switched (CS) network.

78. The computer-readable medium of claim 61 wherein the computer-readable medium is used in a Long Term Evolution (LTE) system and the registration system information is a SIB1.

79. The computer-readable medium of claim 78 wherein the registration area indicator is a tracking area identity (TAI).

80. The computer-readable medium of claim 61 wherein the computer-readable medium is used in a cdma2000 system or a WiMax system.

\* \* \* \* \*